W. F. Tunnard.
Cotton Planter.

No. 94,671.        Patented Sept. 7, 1869.

Witnesses
Rufus R. Rhodes
H. N. Jenkins

Inventor
W. F. Tunnard.

N. PETERS, PHOTO-LITHOGRAPHER, WASHINGTON, D. C.

United States Patent Office.

W. F. TUNNARD, OF EAST BATON ROUGE PARISH, LOUISIANA, ASSIGNOR TO FRED. D. TUNNARD, OF SAME PLACE.

Letters Patent No. 94,671, dated September 7, 1869.

IMPROVEMENT IN COTTON-SEED PLANTER.

The Schedule referred to in these Letters Patent and making part of the same.

*To all whom it may concern:*

Be it known that I, W. F. TUNNARD, of the parish of East Baton Rouge, State of Louisiana, have invented a certain new and useful Improvement in Cotton-Seed Planters; and I do hereby declare the following to be a full, clear, and exact description of the same, reference being had to the annexed drawing, making a part of this specification, in which—

Figure 1:
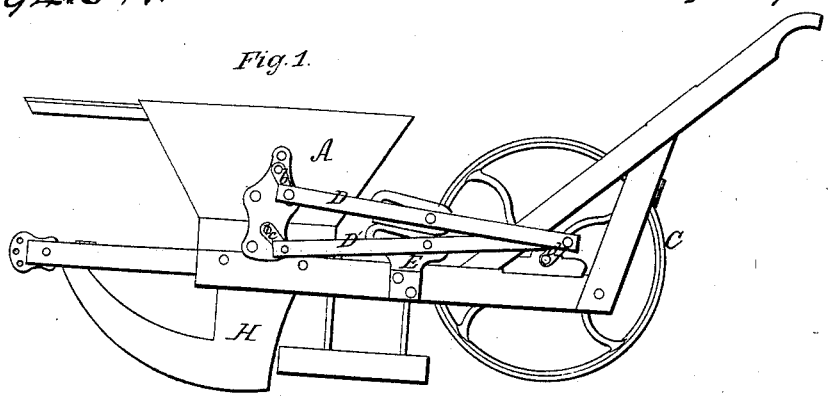
Figure 2:
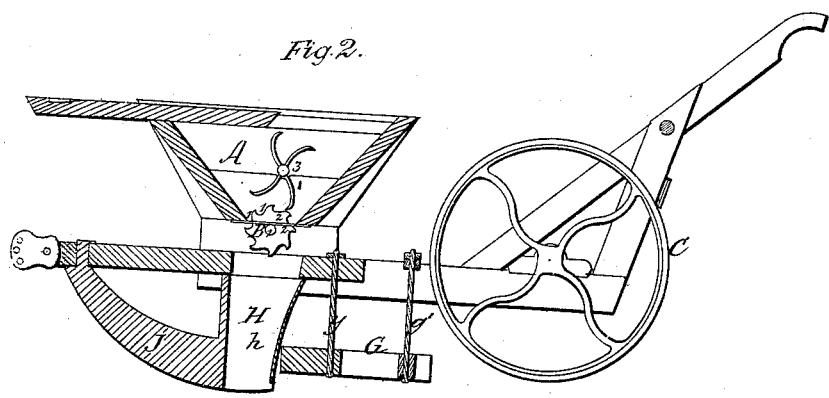
Figure 3:
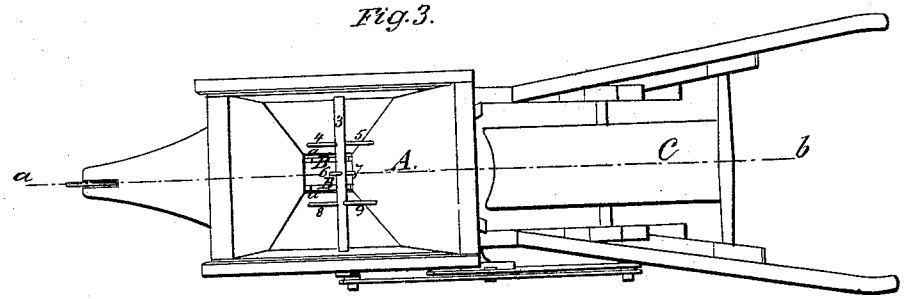

Figure 1 is a side elevation of a machine in which my improvement has been incorporated;

Figure 2, a sectional view of the same machine, the bisection being on the line *a b* of fig. 3; and Figure 3, a plan or top view of the same machine.

My invention is an improvement on C. W. McClanahan's combined cotton and seed-planter, as patented by him, November 27, 1860, by which, dispensing with some of the parts employed in said machine, the alteration of others, and the substitution of new for some of the parts employed in the said machine, as patented, I produce a machine that is adapted exclusively to the planting of cotton-seed, far more effective in its practical operation and use, less liable to get out of order, and which can be manufactured at greatly-reduced cost, as compared with McClanahan's machine.

But my invention will be better understood by referring to the drawing, on which the same letters denote the same parts at all the figures.

On the drawing—

A represents the hopper-formed recipient, from which the seed is planted, and which is secured on the frame of the machine, substantially as shown, by any proper means.

The sides of hopper A extend a few inches below its bottom, and thus provide a means for supporting, in any proper manner, a shaft, 1, on which is mounted two ratchet-wheels, in such manner that most of that part of them which is above the axle enters into the hopper, or more properly project above its bottom, through two narrow elongated openings, *a*, as shown at figs. 2 and 3.

The teeth on these ratchet-wheels, which are marked B B on the drawing, constitute the mechanical agents devised by me, for discharging the seed from the hopper A, in lieu of the cylinder, with projecting blades, that is described in McClanahan's patent, and I have found them far more efficient, in practice, than said cylinder, in every respect whatsoever.

The superiority of my ratchet-wheels results, in part, from the curved formation of the ratchet-projections or teeth 2, around their perimeters, and, in part, from their greatly-reduced width of face, as compared with McClanahan's cylinder.

In order to regulate and control the quantity of seed that is discharged from the hopper, I provide one of the ratchet-wheels B with a removable and adjustable cap or cover, and am thus enabled to discharge a greater or smaller quantity of seed through the opening in which that wheel works, or to confine the discharge exclusively to the other wheel, by covering the whole of the said opening with said cap. This cover could not be conveniently shown on the drawing, and is, therefore, not delineated on the same.

The above constitutes one of the features of my improvement.

Above the bottom of the hopper, on a shaft, 3, supported also in the sides of the hopper, are secured radiating curved arms, 4, 5, 6, 7, 8, 9, for stirring or agitating the cotton-seed, and thus preventing it from packing or "bridging," as it is called, above the discharging-wheels B, and so stopping the operation of the machine.

The shafts 1 and 3 are provided with cranks, *b* and *c*, of precisely equal length with the crank *d* on the shaft of the supporting and driving-wheel C.

Rotation in the same direction is given to the stirrer, for so I call the shaft 3 and its arms, and the ratchet-wheels B B, by means of the pitmen D D', which are connected to the cranks *b c* at one of their extremities, and at the other, both of them, to the crank *d* of the driving-wheel C.

The mere connection of the crank *d* to the cranks *b c* by the two pitmen, would not effect the rotation of the stirrer nor the ratchet-wheels, nor would it prevent the stoppage of the same on the dead-points of the cranks, without some additional mechanical provision to insure such result. Nor would the plan of McClanahan, of pivoting the pitman D to the pitman D' at an intermediate point between the cranks *d* and *c*, effect these objects; for, under that arrangement, the stirrer oscillates in a given arc, and does not rotate on its axis.

It is, therefore, necessary to interpose some agency which will control the said pitmen, in such manner that, as the ends which are connected with the crank *d* are depressed in the rotation of said crank, the opposite end of each will be correspondingly elevated, and *vice versa.*

Hence, I fix a thin wide vertical plate-standard, E, securely to one of the longitudinal pieces of the frame of the machine, in which I make two slots, one above the other, that are cut a little longer than the stroke of the several cranks, and secure each of the said pitmen to the said standard, by means of a projecting pin, *i*, from the centre of which each respectively enter and work in said slots, and thereby establish a connection, which holds the said pitmen, at their centres, in the plane of two lines drawn between the axis of crank *d* and the centres of shafts 1 and 3, while freely allowing an up-and-down vibration of their extremities, and the necessary endwise action or movement, which the rotation of crank *d* compels them to make. In this way I insure my object, and this is another and a very great improvement on McClanahan's machine, for experience has demonstrated that an oscillating stirrer will not answer for cotton-seed planters in actual practice in the field.

The next change I effect in McClanahan's machine is to substitute a triangular fluke, G, sustained by adjustable pendent rods, $g\ g'$, for the two coverers that are employed therein, whereby I not only cover the seed in a better manner, but also remove the clods sufficiently away, on each side of the planted seed, to prevent their interfering with the coming up or the growth of the same, after their germination. By this substitution, I advance still further toward making the machine a perfect one. I employ, substantially, the same kind of drill or trench-forming shoe, H, provided with a large vertical opening, $h$, as a conduit for the seed to the ground, that is used in McClanahan's machine, but I reinforce the same by a curved-front knife, $j$, which is not done in McClanahan's machine. I make no claim, however, to said knife.

I totally discard all means for planting corn in the construction of my improved machine, for I have found that it is impossible to combine the essential features of a cotton-seed planter and of a corn-planter in one and the same machine, without making the same, to a great degree, inoperative and worthless.

In all other respects than herein specified, my improved machine is substantially identical with McClanahan's, and I need not, therefore, further describe it. Its mode of operation is apparent from a mere inspection, and hence it is only necessary further to say that, although the stirrer and the discharging ratchet-wheels B B revolve in the same direction, in consequence of the former being placed above the latter, there is necessarily a reverse effect or action in the operation of the machine, produced by the curvature of the arms of the stirrer and the teeth of the ratchet-wheels on the cotton-seed, which tend greatly to the efficiency of the machine.

Having thus described my invention,

What I claim, and desire to secure by Letters Patent, is—

1. The connecting-rods D D', when both are secured to the crank $d$, the double-slotted standard E, pins $i\ i$ in the connecting-rods D D', in combination with the discharging-wheel B and stirrer 3, when all are connected and arranged as specified.

2. In combination with the elements of the foregoing claim, the fluke G, as set forth.

W. F. TUNNARD.

Witnesses:
RUFUS R. RHODES,
H. N. JENKINS.